United States Patent [19]
Fujita et al.

[11] Patent Number: 4,657,980
[45] Date of Patent: Apr. 14, 1987

[54] THERMOPLASTIC RESIN BLEND COMPRISING 80 TO 95 WT % OF POLYCARBONATE AND 5 TO 20 WT % OF POLY-P-METHYLSTYRENE

[75] Inventors: Yuji Fujita, Saitama; Noboru Yamamoto, Tokyo, both of Japan

[73] Assignee: Toa Nenryo Kogyo Kabushiki Kaisha, Tokyo, Japan

[21] Appl. No.: 788,908

[22] Filed: Oct. 18, 1985

[30] Foreign Application Priority Data

Oct. 30, 1984 [JP] Japan ................. 59-226917

[51] Int. Cl.⁴ ............................................. C08L 69/00
[52] U.S. Cl. ..................................... 525/146; 525/468
[58] Field of Search .............................. 525/146, 468

[56] References Cited

U.S. PATENT DOCUMENTS 4,463,130  7/1984  Serini et al. ........................... 525/67
4,539,371  9/1985  Gunesin ................................. 525/98

Primary Examiner—Theodore E. Pertilla
Attorney, Agent, or Firm—M. B. Kurtzman

[57] ABSTRACT

A thermoplastic resin composition which comprises 80 to 95 wt % of polycarbonate resin and 5 to 20 wt % of poly-p-methylstyrene. The thermoplastic resin composition is useful as a molding material for automotive parts, electric appliances, other industrial products and articles for daily use.

3 Claims, 1 Drawing Figure

PPMS (wt%)

THERMOPLASTIC RESIN BLEND COMPRISING 80 TO 95 WT % OF POLYCARBONATE AND 5 TO 20 WT % OF POLY-P-METHYLSTYRENE

DETAILED DESCRIPTION OF THE INVENTION

FIELD OF INDUSTRIAL APPLICATION

The present invention relates to a new thermoplastic resin composition which is produced by blending a polycarbonate resin with poly-p-methylstyrene.

Polycarbonate resins and other resins which are generally called engineering plastics find general use as an industrial material because of their outstanding heat resistance, low-temperature resistance, mechanical strength, weather resistance, and clarity. The applications of polycarbonate resins include, for example, parts of household appliances and electronic equipment, lenses of signals, electric machines, automotive and aircraft parts, optical instruments, tableware, kitchenware, and cosmetics containers.

PRIOR ART

Polycarbonate is in general industrial use as mentioned above because of its inherent superior physical properties. Yet, there is a demand for further improvement in physical properties for individual applications. For example, resin processors need improvement in fluidity and ductility which are associated with processability, end users need improvement in clarity and heat resistance.

For these reasons, there have been proposed several methods for the modification of polycarbonate resins which is accomplished by blending with other resins. For example, Japanese Patent Publication Nos. 15225/1963 and 71/1964 disclose the blending with ABS resin and MBS (methacrylate-butadiene-styrene copolymer), respectively. The modified polycarbonate is improved in flow characteristics, but is not improved in ductility and heat resistance. Japanese Patent Laid-open No. 48547/1973 discloses the blending with AES resin (acrylonitrile-EP rubber-styrene copolymer). The modified polycarbonate is improved in staining resistance and degradation resistance but is poor in heat resistance. Japanese Patent Laid-open Nos. 102942/1982 and 81357/1984 disclose the blending with ABS resin containing alpha-methylstyrene copolymer. In the former case, the modified polycarbonate is improved in stiffness and impact resistance but is poor in heat resistance. In the latter case, the modified polycarbonate is improved in heat resistance and impact resistance, but nothing is mentioned about the improvement in ductility and transparency. Japanese Patent Laid-open No. 46764/1975 discloses a composition blended with a styrene copolymer. It is improved in impact resistance, stiffness, and moldability, but nothing is mentioned about ductility and transparency. Japanese Patent Laid-open No. 1246/1978 and Japanese Patent Publication No. 503/1977 disclose styrene copolymers which are improved in impact resistance but are poor in heat resistance. Japanese Patent Laid-open No. 18661/1978 discloses a styrene copolymer which is improved in impact resistance, clarity, and fluidity, but mentions nothing about the improvement in ductility which is one feature of the present invention.

It is reported that the elongation at break of polycarbonate increases above the glass transition point (Tg) if polycarbonate is blended with a polystyrene resin, according to Adv. Chem. Sar., 176, 337 (1979). However, this report mentions nothing about the behavior at room temperature. Rather, the elastic modulus of the blended polycarbonate is lower than that of unblended polycarbonate. In addition, the blended polycarbonate is not satisfactory in tensile strength, tensile elongation at break, and heat resistance.

Problems to be solved by the invention

The above-mentioned known modification of polycarbonate resins does not improve fluidity, stiffness, and ductility without decreasing clarity. The present invention was completed to overcome this disadvantage.

Means to solve the problems

The present inventors carried out a series of researches, which led to the findings that the object of the invention is achieved by blending a polycarbonate resin with poly-p-methylstyrene at a certain ratio. It was found that a thermoplastic resin composition which comprises 80 to 95 wt % of polycarbonate resin and 5 to 20 wt % of poly-p-methylstyrene has improved fluidity, stiffness, and ductility without decrease in clarity and heat resistance. The present invention was completed based on this finding.

The resin composition of this invention is a new thermoplastic resin composition which comprises 80 to 95 wt %, preferably 85 to 90 wt %, of polycarbonate resin and 5 to 20 wt %, preferably 10 to 15 wt %. of poly-p-methylstyrene. It is greatly improved in ductility over the known composition blended with polystyrene, and yet it has sufficient heat resistance.

The polycarbonate resin can be obtained by the known phosgene process or ester interchange process, the former including the reaction of a dihydroxydiaryl compound (e.g., bisphenol A) with phosgene, and the latter including the reaction of a dihydroxydiaryl compound with a carbonate ester (e.g., diphenyl carbonate). The above-mentioned poly-p-methylstyrene is obtained by the polymerization of p-methylstyrene of 97% or higher purity, with the remainder being m-methylstyrene. The polymerization is accomplished by solution polymerization in an inert hydrocarbon solvent such as toluene and benzene, by suspension polymerization in a solution containing a suspension stabilizer such as calcium phosphate, polyvinyl alcohol, and hydroxyethyl cellulose, or by emulsion polymerization in an aqueous medium containing a proper surface active agent.

The polymerization catalyst may be of free-radical type, anionic type, or cationic type. Thermal polymerization may also be used. Poly-p-methylstyrene having a molecular weight of several thousands to several millions can be used.

The blending of a polycarbonate resin with poly-p-methylstyrene may be carried out by the ordinary method, e.g., the melt mixing method that employs brabender, extruder, Banbury mixer, mixing roll, or the like, and the solution mixing method that employs a solvent.

Effect of the invention

As compared with the conventional polycarbonate resins and blends thereof, the composition of the invention is superior in fluidity, stiffness, ductility, moldability, and processability. It is useful as a molding material for automotive parts, electric appliances, other industrial products, and articles for daily use.

EXAMPLES

Figure 1:
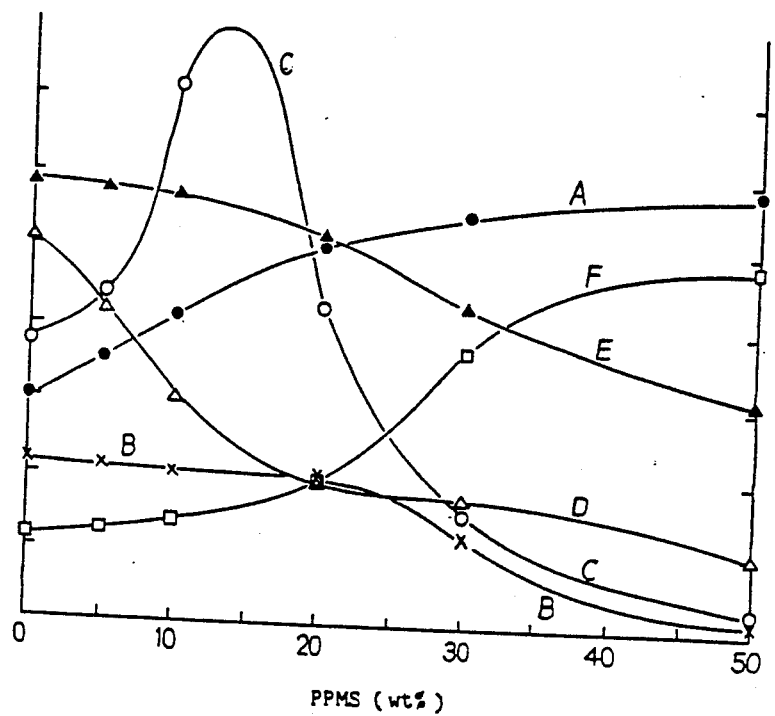
FIG. 1 is a graph showing the physical properties of the compositions of the invention.

The invention is described with reference to the following examples, which are not intended to restrict the scope of the invention.

The following are the materials used in the Examples and Comparative Examples and the apparatus and test methods used for the measurement of physical properties.

(a) Polycarbonate resin: "Upiron S-3000", a product of Mitsubishi Gas Chemical Company, Inc.
(b) Polystyrene resin: "Esprite 8-62", a product of Showa Denko K.K.
(c) Poly-p-methylstyrene: "PMX-H-20", a product of Mobil Co., Ltd.
(d) Styrene-acrylonitrile copolymer (AS): "SAN-C", a product of Mitsubishi Monsanto Co., Ltd.
(e) ABS resin: "ABS-10", a product of Japan Synthetic Rubber Co., Ltd.

Flexural modulus: ASTM D-790
Tensile strength and tensile elongation at break: ASTM D-638
Vicat softening point: ASTM D-1525
Melt viscosity ($\eta_{500}$) Dynamic melt viscosity (poise) at an angular velocity of 500 rad/sec at 250° C., measured with an RDS made by Rheometric Co., Ltd.
Haze: JIS K7105 (with a 0.5 mm thick sheet)
Blending: The resin blending was carried out using a labo plastomill made by Toyo Seiki Co., Ltd. at 270° C. and 100 rpm for 5 minutes.
Molding: Specimens were molded using a hot press at 250° C. under a load of 100 kg/cm$^2$.

EXAMPLES 1 TO 3

Resin compositions were prepared by blending a polycarbonate resin (abbreviated as PC hereinafter) with poly-p-methylstyrene (abbreviated as PPMS hereinafter) in a varied amount of 5, 10, and 20 wt %. They were examined for physical properties. It is noted from Table 1 that the resin compositions are improved in Vicat softening point, tensile strength, and haze over unblended PC (Comparative Example 1), and yet they are almost comparable to it in tensile elongation at break, flexural modulus, and Melt viscosity.

FIG. 1 shows the relationship between tne amount of PPMS in the composition and the physical properties of the composition. Curve A represents flexural modulus, curve B tensile strength, curve C tensile elongation at break, curve D melt viscosity, curve E Vicat softening point, and curve F haze. The composition is greatly improved in tensile elongation at break when incorporated with 10 to 15 wt % of PPMS. In addition, the compositions incorporated with PPMS are greatly improved in ductility over those which are incorporated with polystyrene (Comparative Examples 8 to 10).

COMPARATIVE EXAMPLE 2

A composition was prepared by blending PC with 30 wt % of PPMS. As shown in Table 1, it is equal to or improved over unblended PC (Comparative Example 1), but it is poor in tensile elongation at break, tensile strength, Vicat softening point, and haze.

This result can be readily explained through an examination of scanning type electron microscope photographs. In the case of the composition (PC/PPMS=90/10 by weight) in Example 2, the electron microscope photographs show the PPMS domain is deformed into the rodlike shape that extends in the elongation direction and the rupture cross-section is smooth. In contrast, in the case of the composition (PC/PPMS=70/30 by weight) in Comparative Example 2, the PPMS domain is not deformed but there are large voids and brittle fracture.

It is concluded that the resin composition of this invention is improved in fluidity, stiffness, and ductility without loss of heat resistance and clarity which are the inherent properties of PC, when the blending ratio of PC/PPMS is 95/5 to 80/20 (by weight), preferably 90/10 to 85/15 (by weight).

COMPARATIVE EXAMPLES 3 TO 4

The physical properties of a PC composition blended with 50 wt % of PPMS and PPMS alone were measured. The results are shown in Table 1.

COMPARATIVE EXAMPLE 5

A PC composition blended with styrene-acrylonitrile copolymer (abbreviated as AS hereinafter) at a ratio of PC/AS=90/10 by weight has improved flexural modulus and melt viscosity, as in Example 2; however, it is poor in tensile strength, tensile elongation at break, haze, and Vicat softening point. It is even inferior in tensile strength, Vicat softening point, and haze to unblended PC (in Comparative Example 1).

COMPARATIVE EXAMPLES 6 AND 7

PC compositions each blended with ABS resin at a ratio of PC/ABS=90/10 by weight and PC/ABS=50/50 by weight have improved melt viscosity over unblended PC; however, they are not improved in flexural modulus, tensile strength, and tensile elongation at break.

COMPARATIVE EXAMPLES 8 TO 10

PC compositions each blended with polystyrene resin (abbreviated as PS hereinafter) at a ratio of 5, 10, and 20 wt % are inferior in tensile elongation at break and Vicat softening point to those blended with PPMS (in Examples 1 to 3).

TABLE 1

| Example | PC | PPMS | PS | AS | ABS | Flexural modulus (kg/cm$^2$) | Tensile strength (kg/cm$^2$) | Tensile elongation at break (%) | $\eta_{500}$ (poise) | Vicat softening point (°C.) | Haze (%) |
| --- | --- | --- | --- | --- | --- | --- | --- | --- | --- | --- | --- |
| 1 | 95 | 5 | — | — | — | 22,500 | 710 | 87 | 0.84 × 10$^4$ | 158.0 | 12.5 |
| 2 | 90 | 10 | — | — | — | 23,100 | 700 | 142 | 0.60 × 10$^4$ | 157.2 | 13.6 |
| 3 | 80 | 20 | — | — | — | 24,000 | 700 | 85 | 0.38 × 10$^4$ | 152.0 | 19.3 |
| 8* | 95 | — | 5 | — | — | 22,500 | 690 | 75 | 0.95 × 10$^4$ | 154.4 | 12.4 |
| 9* | 90 | — | 10 | — | — | 23,100 | 680 | 115 | 0.82 × 10$^4$ | 152.0 | 13.6 |
| 10* | 80 | — | 20 | — | — | 24,000 | 680 | 75 | 0.56 × 10$^4$ | 146.0 | 19.2 |
| 1* | 100 | — | — | — | — | 22,000 | 720 | 75 | 1.04 × 10$^4$ | 158.2 | 11.1 |
| 2* | 70 | 30 | — | — | — | 24,500 | 620 | 30 | 0.35 × 10$^4$ | 143.0 | 36.8 |

TABLE 1-continued

| Example | PC | PPMS | PS | AS | ABS | Flexural modulus (kg/cm$^2$) | Tensile strength (kg/cm$^2$) | Tensile elongation at break (%) | $\eta_{500}$ (poise) | Vicat softening point (°C.) | Haze (%) |
|---|---|---|---|---|---|---|---|---|---|---|---|
| 3* | 50 | 50 | — | — | — | 24,900 | 510 | 6 | $0.20 \times 10^4$ | 121.5 | 48.0 |
| 4* | — | 100 | — | — | — | 28,000 | 440 | 3 | $0.08 \times 10^4$ | 107.0 | 8.0 |
| 5* | 90 | — | — | 10 | — | 23,200 | 620 | 80 | $0.69 \times 10^4$ | 153.8 | 49.2 |
| 6* | 90 | — | — | — | 10 | 19.500 | 620 | 38 | $0.60 \times 10^4$ | 153.6 | 90.5 |
| 7* | 50 | — | — | — | 50 | 18,500 | 485 | 10 | $0.28 \times 10^4$ | 132.0 | 98.0 |

*Comparative Examples

What is claimed is:

1. A thermoplastic resin blend consisting essentially of 80 to 95 wt % polycarbonate resin and 5 to 20 wt % of poly-p-methylstyrene.

2. The blend in accordance with claim 1 consisting essentially of 85 to 90 wt % polycarbonate and 10 to 15 wt % poly-p-methylstyrene.

3. The blend of claim 1 wherein the polycarbonate resin is obtained from the reaction of a dihydroxydiaryl compound with phosgene or from the reaction of a dihydroxydiaryl compound with a carbonate ester and the poly-p-methylstyrene is obtained by the polymerization of p-methylstyrene.

* * * * *